(12) United States Patent  
Schneider (10) Patent No.: US 9,053,197 B2  
(45) Date of Patent: Jun. 9, 2015

(54) SUGGESTING WEBSITES (75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 599 days.

(21) Appl. No.: 12/324,760

(22) Filed: Nov. 26, 2008

(65) Prior Publication Data

US 2010/0131542 A1 May 27, 2010

(51) Int. Cl.
*G06F 17/30* (2006.01)

(52) U.S. Cl.
CPC .... *G06F 17/30876* (2013.01); *G06F 17/30867* (2013.01)

(58) Field of Classification Search
CPC .............. G06F 17/3064; G06F 17/30867
See application file for complete search history.

(56) References Cited

U.S. PATENT DOCUMENTS

| | | | |
|---|---|---|---|
| 5,796,952 A * | 8/1998 | Davis et al. .................. 709/224 |
| 6,606,657 B1 * | 8/2003 | Zilberstein et al. ........... 709/224 |
| 6,671,681 B1 * | 12/2003 | Emens et al. ................. 707/706 |
| 7,269,643 B2 * | 9/2007 | Spaid ............................ 709/223 |
| 7,587,391 B1 * | 9/2009 | Bostock et al. ....................... 1/1 |
| 7,617,209 B2 * | 11/2009 | Whitman et al. ..................... 1/1 |
| 7,644,078 B2 * | 1/2010 | Sastry et al. ..................... 706/20 |
| 7,644,079 B2 * | 1/2010 | Sastry et al. ..................... 706/20 |
| 7,761,423 B1 * | 7/2010 | Cohen ............................. 707/637 |
| 7,774,341 B2 * | 8/2010 | Aravamudan et al. ........ 707/731 |
| 7,788,358 B2 * | 8/2010 | Martino ........................ 709/223 |
| 7,818,318 B2 * | 10/2010 | Berger et al. .................. 707/725 |
| 7,853,630 B2 * | 12/2010 | Martino et al. ......... 707/999.003 |
| 7,925,649 B2 * | 4/2011 | Jeh et al. ........................ 707/722 |
| 7,996,396 B2 * | 8/2011 | Leblang et al. ................ 707/727 |
| 8,204,928 B2 * | 6/2012 | Elven ............................. 709/200 |
| 2002/0198882 A1 * | 12/2002 | Linden et al. .................... 707/10 |
| 2005/0071465 A1 * | 3/2005 | Zeng et al. ..................... 709/224 |
| 2007/0162424 A1 * | 7/2007 | Jeh et al. ............................ 707/2 |
| 2007/0203894 A1 * | 8/2007 | Jones et al. ........................ 707/3 |
| 2007/0208729 A1 * | 9/2007 | Martino ............................. 707/5 |
| 2007/0239671 A1 * | 10/2007 | Whitman et al. .................. 707/2 |
| 2008/0027936 A1 * | 1/2008 | Liu et al. .......................... 707/7 |
| 2008/0077561 A1 * | 3/2008 | Yomtobian ........................ 707/3 |
| 2008/0250026 A1 * | 10/2008 | Linden et al. .................... 707/10 |
| 2008/0306830 A1 * | 12/2008 | Lasa et al. ....................... 705/26 |
| 2009/0164929 A1 * | 6/2009 | Chen et al. ..................... 715/769 |
| 2009/0171746 A1 * | 7/2009 | Lee et al. ........................ 705/10 |
| 2009/0210409 A1 * | 8/2009 | Levin ................................ 707/5 |
| 2009/0327913 A1 * | 12/2009 | Adar et al. ..................... 715/745 |
| 2010/0095215 A1 * | 4/2010 | Elven ............................. 715/736 |
| 2010/0185609 A1 * | 7/2010 | Wright et al. .................. 707/724 |
| 2011/0040751 A1 * | 2/2011 | Chandrasekar et al. ....... 707/725 |
| 2011/0060736 A1 * | 3/2011 | Bailey et al. ................... 707/727 |
| 2011/0087658 A1 * | 4/2011 | Lunt et al. ...................... 707/727 |
| 2011/0093346 A1 * | 4/2011 | Lunt et al. .................. 705/14.71 |
| 2011/0161316 A1 * | 6/2011 | Jeh et al. ........................ 707/727 |

* cited by examiner

*Primary Examiner* — James Trujillo
*Assistant Examiner* — Hubert Cheung
(74) *Attorney, Agent, or Firm* — Lowenstein Sandler LLP (57) ABSTRACT

An apparatus and a method for suggesting a web site is described. In one embodiment, a user at a client enters a web address. A suggestion server receives the web address and generates one or more suggested web addresses for the user based on an analysis of captured aggregate online users behavior in relation to the web address. The suggestion server stores and organizes results of the analysis of the captured aggregate online users behavior. The results includes a list of two or more substantially related and relevant web addresses. The suggestion server compares the web address with the results of the analysis to generate the one or more suggested web addresses. The one or more suggested web addresses are sent to the client.

12 Claims, 6 Drawing Sheets

SUGGESTING WEBSITES

TECHNICAL FIELD

Embodiments of the present invention relate to computing systems, and more particularly, to a method and apparatus for suggesting websites.

BACKGROUND

With the increasing popularity of the Internet and the World Wide Web, it is common for on-line users to utilize search engines to search the Internet for desired information. In order to perform a search, a user submits a query containing one or more query terms. A query server program of the search engine processes the query to identify any items that match the terms of the query. The set of items identified by the query server program is referred to as a "query result." In web-based implementations, the query result is typically presented to the user as a hypertextual listing of the located items.

However such queries may not be actual representation of what the user meant to search. As such, the process of parsing from one web site to another web site consumes significant time to the user, and increases the amount of time the user must spend before reaching a web site relevant to his/her query. A need therefore exists for a method for suggesting websites based on collective user behavior and not the actual query entries.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for suggesting a web site. In one embodiment, a user at a client enters a web address. A suggestion server receives the web address and generates one or more suggested web addresses for the user based on an analysis of captured aggregate online users behavior in relation to the web address. The suggestion server stores and organizes results of the analysis of the captured aggregate online users behavior. The results includes a list of two or more substantially related and relevant web addresses. The suggestion server compares the web address with the results of the analysis to generate a number of suggested web addresses. The suggested web addresses are sent to the client. In other words, a service is provided where a user can enter a web address, and the service returns a list of pages "like" that one, based on the criterion that others who have visited that particular web address have also visited the other sites listed, sorted based on recency of access and proportion of visitors to the first site who visited both sites. It is possible that no results are being sent to the client. In that scenario, there may not have been any matches found.

Figure 1:
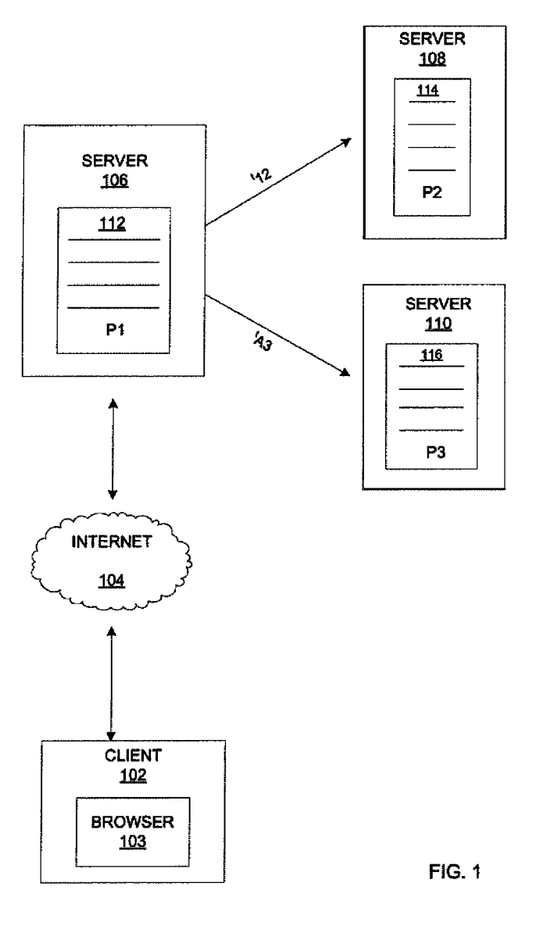
FIG. 1 is a block diagram illustrating one embodiment of a system for analyzing a user online behavior.

FIG. 1 is a block diagram illustrating one embodiment of a system for analyzing a user online behavior. A client 102 includes a web browser 103. A user enters a web address in the web browser 103 to access a web page P1 112 from a web server 106 via a network such as the Internet 104. The user at client 102 may then visit another web page P2 114 from another web server 108 within a time $t_{1-2}$ another example, the user at client 102 may visit another web page P3 116 from another web server 110 within a time $t_{1-3}$. For illustration purposes, each web page is stored with a corresponding web server. However, those of ordinary skills in the art will recognize that the different web pages 112, 114, 116 may also be stored on a single web server or one or more web servers.

Recency of access is measured using $t_{1-2}$ and $t_{1-3}$. How close together the page visits are both temporally and behaviorally. If the user visits web page P1 112 and then immediately visits web page P2 114, the visit to web page P2 114 is behaviorally adjacent to the visit to web page P1 (or, web page P1 and web page P2 are behaviorally adjacent pages for that user). In one embodiment, this adjacency relationship index is calibrated on a continuous −1 to 1 scale, where −1 is not adjacent at all, and 1 is entirely adjacent. Furthermore, the adjacency relationship index can be adjusted by time between events. For example, web page P1 112 and web page P2 114 are more strongly adjacent if the user's act of clicking on web page P1 112 and web page P2 114 happened closer together in time (i.e. $t_{1-2}$ is less than $t_{1-3}$).

In one embodiment, the aggregate statistics are collected and used to generate a ranking of relevant web pages. For example, if 80% of users have web page P1 112 and web page P2 114 behaviorally adjacent, and 25% of users have web page P1 112 and web page P3 116 behaviorally adjacent, web page P2 114 would rank higher than web page P3 116 on a query for web page P1 112.

Figure 2:
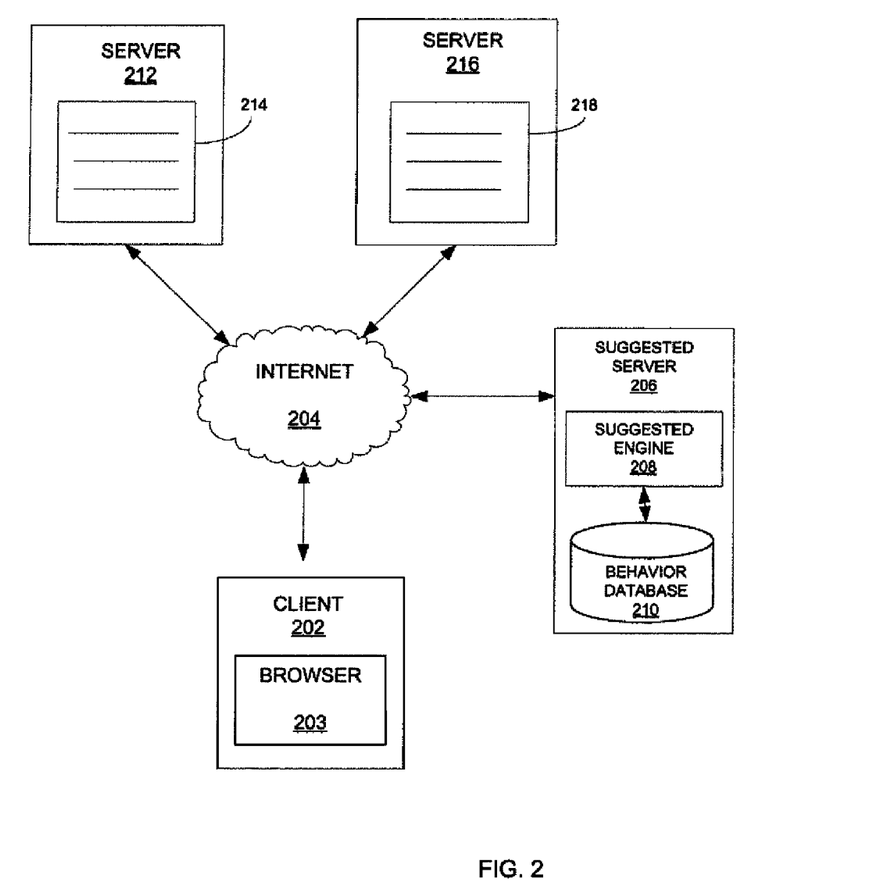
FIG. 2 is a block diagram illustrating one embodiment of a system for suggesting a website.

FIG. 2 is a block diagram illustrating one embodiment of a system for suggesting a relevant website. A client 202 includes a web browser 203. Client 202 communicates with suggestion server 206. In one embodiment, suggestion server 206 receives a web address of a web page 214 of a web server 212 from web browser 203 via a network such as the Internet 204.

In one embodiment, suggestion server 206 includes a suggestion engine 208 coupled to a user behavior database 210. The suggestion engine 208 generates a list of one or more relevant web addresses based on an analysis of captured aggregate online users behavior stored in the user behavior database 210 in relation to the web address provided by client 202. Suggestion engine sends the list to client 202. Browser 203 can act on the list by visiting a suggested web page 218 from web server 216.

In one embodiment, user behavior database 210 stores and organizes results of the analysis of the captured aggregate online users behavior. Suggestion engine 208 compares the provided web address from client 202 with the results of the analysis in behavior database 210 to generate suggested web addresses.

Figure 3:
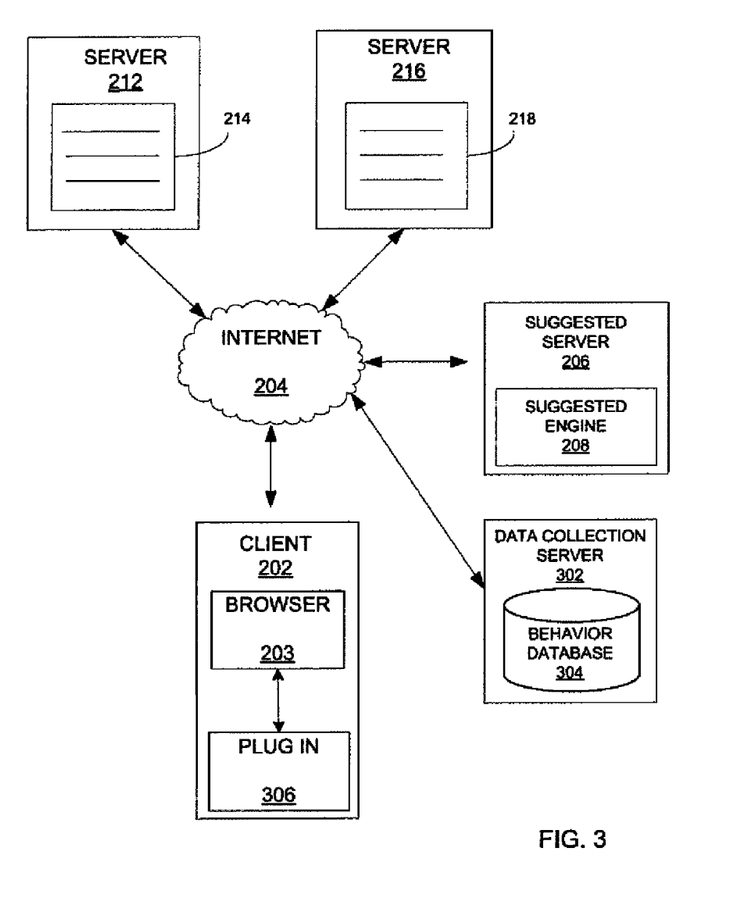
FIG. 3 is a block diagram illustrating another embodiment of a system for suggesting a website.

FIG. 3 is a block diagram illustrating another embodiment of a system for suggesting a website. A third party server such as a data collection server 302 collects aggregate online users behavior and stores the data in a behavior database 304. Suggestion engine 208 communicates with data collection server 302 to access the behavior database 304 to analyze the web address and generate a list of suggested relevant web addresses.

In another embodiment, the data stored in behavior database 304 of data collection server 302 may be collected using a plug-in 306 installed on the browser 203 of client 202. The browser plug-in 306 can be installed on several computers connected to the Internet 204 to gather a large sample data to generate web addresses that are relevant to each other. The sample data may include temporal and behavioral data of aggregate online users. For example, the behavioral data includes a behavioral adjacent index for two or more web addresses of web pages visited by a user. A first web page is behaviorally adjacent to a second web page when the user visits the first web page and visits the second web page within a predetermined amount of time. For the temporal data, a first web page is behaviorally adjacent to a second web page when the user visits the first web page and immediately visits the second web page. The temporal data increases the behavioral adjacent index when the user visits the first web and immediately visits the second web page.

Figure 4:
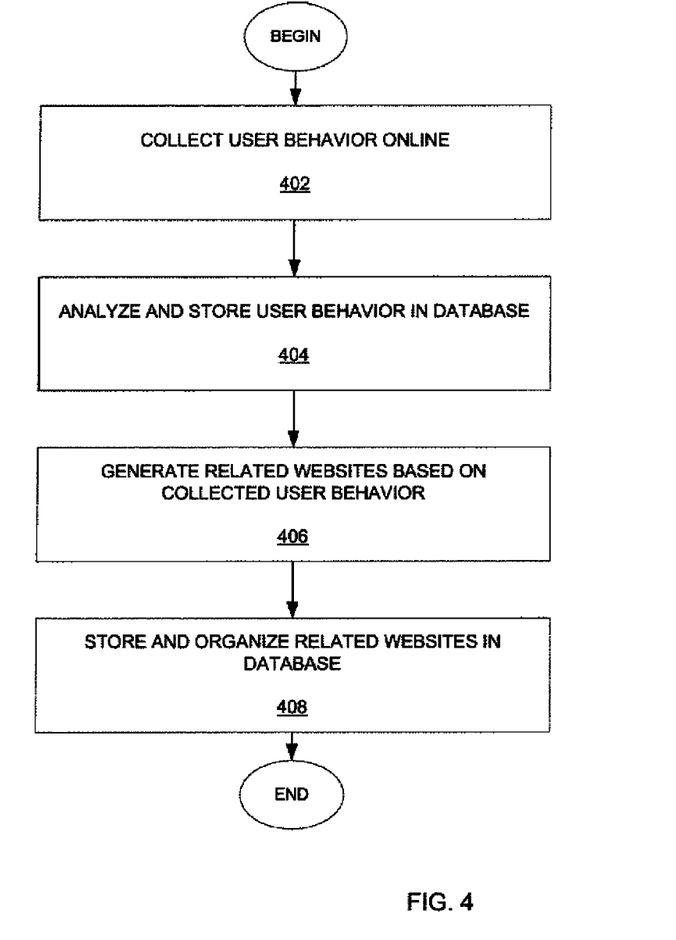
FIG. 4 is a flow diagram illustrating one embodiment of a method for analyzing and storing a user online behavior.

FIG. 4 is a flow diagram illustrating one embodiment of a method for analyzing and storing a user online behavior. At 402, online user behavior is collected, analyzed and stored. In particular, behavioral and temporal data are analyzed. At 406, relevant and related web sites are generated and ranked based on the online user behavior. The websites are stored and organized in a behavior database. The ranking is affected by an adjacency behavioral index as previously described. The adjacency behavioral index is further affected by a temporal relationship index as previously described.

Figure 5:
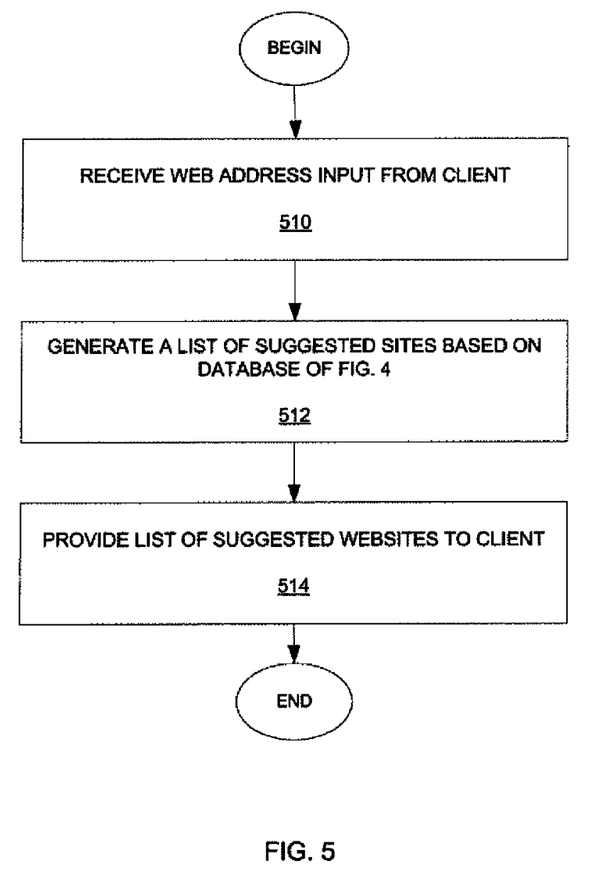
FIG. 5 is a flow diagram illustrating one embodiment of a method for generating a list of suggested websites to a client using the collected data of the client online behavior of FIG. 4.

FIG. 5 is a flow diagram illustrating one embodiment of a method for generating a list of suggested websites to a client using the collected data of the client online behavior of FIG. 4. At 510, a suggestion server receives a web address input from a client. At 512, the suggestion server generates a list of suggested and relevant web sites based on the ranking and behavior analysis performed with respect to FIG. 4. At 514, suggestion server provides a list of suggested web sites to the client.

Figure 6:
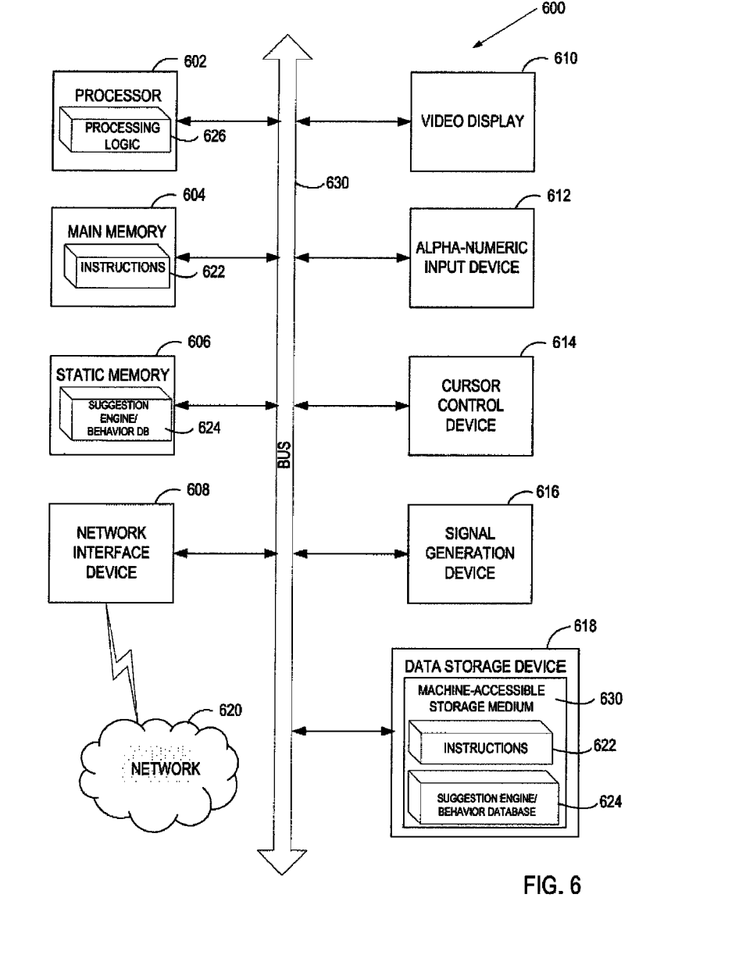
FIG. 6 is a block diagram illustrating an example of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The computer-accessible storage medium 630 may also be used to store the suggestion engine and behavior database 624 as presently described. The suggestion engine and behavior database 624 may also be stored in other sections of computer system 600, such as static memory 606.

While the computer-accessible storage medium 630 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the computer system and that cause the computer system to perform any one or more of the methodologies of the present invention. The term "computer-accessible storage medium" shall accordingly be taken to include, but not be limited to, solid-state memories, optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a web address from a client;
analyzing, by a processing device, aggregate behavior of a plurality of users in view of the web address, by:
determining a first number of users of the plurality of users that visit both of the web address and a first web page within a first time interval;
determining a second number of users of the plurality of users that visit both of the web address and a second web page within a second time interval;
generating a first adjacency index value for the first web page and a second adjacency index value for the second web page, wherein the first and second adjacency index values each comprise a value on an adjacency index scale for the web address indicating temporal adjacency between visits to the web address and another web page, and wherein the first adjacency index value for the first web page is higher than the second adjacency index value for the second web page on the adjacency index scale in view of the first time interval being less than the second time interval; and
determining that the first number of users is greater than the second number of users;
ranking the first web page higher than the second web page in view of the first adjacency index value being higher than the second adjacency index value and in view of the first number of users being greater than the second number of users;
generating, by a processing device, a suggested web address that comprises the first web page in view of the first web page being ranked higher than the second web page; and
sending the suggested web address to the client.

2. The method of claim 1 further comprising computing the adjacency index scale.

3. The method of claim 2 wherein at least a portion of the aggregate behavior of the plurality of users is captured by a web browser plug-in.

4. The method of claim 1 wherein the aggregate behavior is collected by a third party.

5. A server comprising:
a network interface device; and
a processing device, coupled to the network interface device, to:
receive, via the network interface device, a web address from a client,
analyze aggregate behavior of a plurality of users in view of the web address, by:
determining a first number of users of the plurality of users that visit both of the web address and a first web page within a first time interval;
determining a second number of users of the plurality of users that visit both of the web address and a second web page within a second time interval;
generating a first adjacency index value for the first web page and a second adjacency index value for the second web page, wherein the first and second adjacency index values each comprise a value on an adjacency index scale for the web address indicating temporal adjacency between visits to the web address and another web page, and wherein the first adjacency index value for the first web page is higher than the second adjacency index value for the second web page on the adjacency index scale in view of the first time interval being less than the second time interval; and
determining that the first number of users is greater than the second number of users;
rank the first web page higher than the second web page in view of the first adjacency index value being higher than the second adjacency index value and in view of the first number of users being greater than the second number of users;
generate a suggested web address that comprises the first web page in view of the first web page being ranked higher than the second web page; and
send, via the network interface device, the suggested web address to the client.

6. The server of claim 5 wherein the processing device is further to compute the adjacency index scale.

7. The server of claim 5 wherein the aggregate behavior is collected by a third party.

8. The server of claim 5 wherein at least a portion of the aggregate behavior of the plurality of users is captured by a web browser plug-in.

9. A non-transitory computer-accessible storage medium comprising instructions that, when executed by a processing device, cause the processing device to:

receive a web address from a client;

analyze, by the processing device, aggregate behavior of a plurality of users in view of the web address, by:

determining a first number of users of the plurality of users that visit both of the web address and a first web page within a first time interval;

determining a second number of users of the plurality of users that visit both of the web address and a second web page within a second time interval;

generating a first adjacency index value for the first web page and a second adjacency index value for the second web page, wherein the first and second adjacency index values each comprise a value on an adjacency index scale for the web address indicating temporal adjacency between visits to the web address and another web page, and wherein the first adjacency index value for the first web page is higher than the second adjacency index value for the second web page on the adjacency index scale in view of the first time interval being less than the second time interval; and determining that the first number of users is greater than the second number of users;

rank the first web page higher than the second web page in view of the first adjacency index value being higher than the second adjacency index value and in view of the first number of users being greater than the second number of users;

generate, by the processing device, a suggested web address that comprises the first web page in view of the first web page being ranked higher than the second web page; and sending the suggested web address to the client.

10. The non-transitory computer-accessible storage medium of claim 9 wherein the processing device is further to compute the adjacency index scale.

11. The non-transitory computer-accessible storage medium of claim 10 wherein at least a portion of the aggregate behavior of the plurality of users is captured by a web browser plug-in.

12. The non-transitory computer-accessible storage medium of claim 9 wherein the aggregate behavior is collected by a third party.

* * * * *